(12) United States Patent
Kwon et al.

(10) Patent No.: US 9,196,898 B2
(45) Date of Patent: Nov. 24, 2015

(54) STEPPED ELECTRODE ASSEMBLY

(71) Applicant: LG Chem, Ltd., Seoul (KR)

(72) Inventors: Sungjin Kwon, Daejeon (KR);
Dong-Myung Kim, Daejeon (KR); Ki Woong Kim, Daejeon (KR); Soonho Ahn, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/845,734

(22) Filed: Mar. 18, 2013

(65) Prior Publication Data

US 2014/0134484 A1 May 15, 2014

Related U.S. Application Data

(63) Continuation of application No. PCT/KR2013/002102, filed on Mar. 15, 2013.

(60) Provisional application No. 61/725,739, filed on Nov. 13, 2012.

(30) Foreign Application Priority Data

Feb. 14, 2013 (KR) .................. 10-2013-0015760

(51) Int. Cl.
*H01M 4/02* (2006.01)
*H01M 4/13* (2010.01)
(Continued)

(52) U.S. Cl.
CPC .............. *H01M 4/13* (2013.01); *H01M 10/052* (2013.01); *H01M 10/0585* (2013.01);
(Continued)

(58) Field of Classification Search
None
See application file for complete search history.

(56) References Cited

U.S. PATENT DOCUMENTS 3,442,717 A  5/1969 Horn et al.
4,964,877 A  10/1990 Keister et al.
(Continued)

FOREIGN PATENT DOCUMENTS

CN  101107736 A  1/2008
JP  02-056856  2/1990
(Continued)

OTHER PUBLICATIONS

Inernational Search Report for Application No. PCT/KR2013/001815 dated Jun. 27, 2013.
(Continued)

*Primary Examiner* — Patrick Ryan
*Assistant Examiner* — Haixia Zhang
(74) *Attorney, Agent, or Firm* — Lerner, David, Littenberg, Krumholz & Mentlik, LLP

(57) ABSTRACT

Disclosed herein is an electrode assembly including two or more electrode plates, each of which has electrode tabs, and a separator plate disposed between the electrode plates and/or a one-unit separation sheet disposed between the electrode plates to cover side surfaces of the electrode plates, which constitute an electrode tab non-formation region, wherein the electrode plates are stacked in a height direction on the basis of a plane such that the electrode plates having opposite polarities face each other in a state in which the separator plate and/or the separation sheet is disposed between the electrode plates, a stack constituted by the electrode plates includes electrode plates having different sizes, and an absolute value of the difference in thickness between the electrode plates having different sizes facing each other is 0 to 79 μm.

29 Claims, 8 Drawing Sheets

(51) Int. Cl.
  *H01M 10/052* (2010.01)
  *H01M 10/0585* (2010.01)
  *H01M 2/16* (2006.01)
  *H01M 10/42* (2006.01)

(52) U.S. Cl.
  CPC ...... *H01M 2/1673* (2013.01); *H01M 2004/021* (2013.01); *H01M 2010/4292* (2013.01); *Y02E 60/122* (2013.01); *Y02T 10/7011* (2013.01)

(56) References Cited

U.S. PATENT DOCUMENTS

| | | | |
|---|---|---|---|
| 5,633,097 | A | 5/1997 | Miller |
| 5,652,074 | A | 7/1997 | Larson, III et al. |
| 6,224,995 | B1 | 5/2001 | Fauteux et al. |
| 6,610,443 | B2 | 8/2003 | Paulot et al. |
| 6,946,220 | B2 | 9/2005 | Probst et al. |
| 7,479,349 | B2 | 1/2009 | O'Phelan et al. |
| 7,595,132 | B2 | 9/2009 | Kang et al. |
| 2001/0005561 | A1* | 6/2001 | Yamada et al. ............... 429/152 |
| 2002/0160257 | A1* | 10/2002 | Lee et al. ...................... 429/130 |
| 2005/0164094 | A1* | 7/2005 | Kotato et al. ................. 429/331 |
| 2005/0214642 | A1 | 9/2005 | Kim et al. |
| 2006/0275661 | A1* | 12/2006 | Kim et al. ..................... 429/217 |
| 2006/0286456 | A1 | 12/2006 | Fu et al. |
| 2007/0054180 | A1 | 3/2007 | Miyajima et al. |
| 2007/0287064 | A1* | 12/2007 | Suzuki et al. ................. 429/217 |
| 2008/0137890 | A1 | 6/2008 | Petersen et al. |
| 2009/0075168 | A1 | 3/2009 | Lee |
| 2009/0159582 | A1 | 6/2009 | Chami et al. |
| 2010/0112451 | A1* | 5/2010 | Shibutani et al. ........ 429/231.95 |
| 2011/0183183 | A1 | 7/2011 | Grady et al. |
| 2011/0274955 | A1 | 11/2011 | Park et al. |
| 2011/0287308 | A1 | 11/2011 | Kim et al. |
| 2012/0015223 | A1 | 1/2012 | Bhardwaj et al. |
| 2012/0015236 | A1 | 1/2012 | Spare |
| 2012/0135299 | A1 | 5/2012 | Kwon et al. |
| 2012/0156551 | A1 | 6/2012 | Cho |
| 2013/0144167 | A1 | 6/2013 | Lee et al. |

FOREIGN PATENT DOCUMENTS

| | | |
|---|---|---|
| JP | 06-260209 | 9/1994 |
| JP | 09-082361 | 3/1997 |
| JP | 10-270014 | 10/1998 |
| JP | H10296879 A | 11/1998 |
| JP | 2001028275 A | 1/2001 |
| JP | 2001167743 A | 6/2001 |
| JP | 2002199910 A | 7/2002 |
| JP | 2004111219 A * | 4/2004 |
| JP | 3611765 B2 | 1/2005 |
| JP | 3680797 B2 | 8/2005 |
| JP | 2006-278331 A | 10/2006 |
| JP | 2009-218105 A | 9/2009 |
| KR | 20-0207948 | 1/2001 |
| KR | 1020010055968 A | 7/2001 |
| KR | 20010104150 A | 11/2001 |
| KR | 1020030066960 A | 8/2003 |
| KR | 20050020357 A | 3/2005 |
| KR | 20050036466 A | 4/2005 |
| KR | 100670492 B1 | 1/2007 |
| KR | 20070066401 A | 6/2007 |
| KR | 1020070075941 A | 7/2007 |
| KR | 1020070099068 A | 10/2007 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 20090028243 A | 3/2009 |
| KR | 20090062409 A | 6/2009 |
| KR | 20100137290 A | 12/2010 |
| KR | 20110105737 A | 9/2011 |
| KR | 20110112241 A | 10/2011 |
| KR | 20110128594 A | 11/2011 |
| KR | 20120060706 A | 6/2012 |
| WO | 0072392 A1 | 11/2000 |
| WO | 2012/009423 A1 | 1/2012 |
| WO | 2012053772 A2 | 4/2012 |
| WO | 2013-180378 A1 | 12/2013 |

OTHER PUBLICATIONS

International Search Report for Application No. PCT/KR2013/002118 dated Jun. 28, 2013.
International Search Report for Application No. PCT/KR2013/002127 dated Jun. 27, 2013.
Chinese Office Action for Application No. 201380002792.X dated Apr. 3, 2015.
Machine translation of KR 2003-0066960 (Jang).

* cited by examiner

100

STEPPED ELECTRODE ASSEMBLY

CROSS REFERENCE TO RELATED APPLICATIONS

The present application is a continuation of International Application No. PCT/KR2013/002102 filed Mar. 15, 2013, which claims the benefit of the filing date of Korean Patent Application No. 10-2013-0015760 filed Feb. 14, 2013 and U.S. Provisional Patent Application No. 61/725,739 filed on Nov. 13, 2012, the disclosures of which are hereby incorporated herein by reference.

TECHNICAL FIELD

The present invention relates to an electrode assembly constituting a secondary battery and, more particularly, to an electrode assembly having a stepped structure.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide powers and capacities suitable for devices to which the lithium secondary batteries are applied. In addition, there is a strong need to reduce the size and weight of the lithium secondary batteries.

The lithium secondary batteries may be classified into a cylindrical battery cell, a prismatic battery cell, and a pouch-shaped battery cell based on the shapes thereof. Among these batteries, the pouch-shaped battery cell, which can be stacked with high integration, has a high energy density per unit weight, is inexpensive, and can be easily modified, has attracted considerable attention.

FIGS. 1A and 1B are exploded perspective views typically showing the general structure of a conventional representative pouch-shaped secondary battery.

Referring to FIG. 1A, a pouch-shaped secondary battery 10 includes a stacked type electrode assembly 20 having pluralities of electrode tabs 21 and 22 protruding therefrom, two electrode leads 30 and 31 respectively connected to the electrode tabs 21 and 22, and a battery case 40 to receive the stacked type electrode assembly 20 in a sealed state such that portions of the electrode leads 30 and 31 are exposed outward from the battery case 40.

The battery case 40 includes a lower case 42 having a depressed receiving part 41, in which the stacked type electrode assembly 20 is located, and an upper case 43 to cover the lower case 42 such that the stacked type electrode assembly 20 is sealed in the battery case 40. The upper case 43 and the lower case 42 are connected to each other by thermal welding in a state in which the stacked type electrode assembly 20 is mounted therein to form an upper end sealed part 44, side sealed parts 45 and 46, and a lower end sealed part 47.

As shown in FIG. 1A, the upper case 43 and the lower case 42 may be configured as separate members. As shown in FIG. 1B, on the other hand, one end of the upper case 43 may be integrally formed at a corresponding end of the lower case 42 such that the upper case 43 and the lower case 42 may be hingedly connected to each other.

In addition, as shown in FIGS. 1A and 1B, the pouch-shaped battery cell is configured to have a structure in which electrode terminals constituted by the electrode tabs and the electrode leads connected to the electrode tabs are formed at one end of the stacked type electrode assembly. Alternatively, a pouch-shaped battery cell configured to have a structure in which electrode terminals are formed at one end and the other end of an electrode assembly may also be manufactured using the above method.

Meanwhile, FIGS. 1A and 1B show the pouch-shaped battery cell using the stacked type electrode assembly. Alternatively, a pouch-shaped battery cell using a wound type or a jelly-roll type electrode assembly may be manufactured using the above method.

DISCLOSURE

Technical Problem

As shown in FIGS. 1A and 1B, the pouch-shaped battery cell is generally manufactured so as to have an approximately rectangular parallelepiped structure.

However, a device is not generally formed in the shape of a rectangular parallelepiped. For example, sides of a smartphone may be curved to improve grip.

In a case in which a battery cell having a rectangular parallelepiped structure or a battery pack having a rectangular parallelepiped structure is mounted in a device designed so as to have such curved portions, however, space utilization of the device may be lowered.

That is, the curved portions of the device have dead spaces, in which the battery cell cannot be mounted. Ultimately, such dead spaces lower the capacity of the device per unit volume.

Therefore, the present invention has been made to solve the above problems, and it is an object of the present invention to provide an electrode assembly that is capable of maximally improving the capacity of a device per unit volume.

Technical Solution

In accordance with one aspect of the present invention, the above and other objects can be accomplished by the provision of an electrode assembly including two or more electrode plates, each of which has electrode tabs, and a separator plate disposed between the electrode plates and/or a one-unit separation sheet disposed between the electrode plates to cover side surfaces of the electrode plates, which constitute an electrode tab non-formation region, wherein the electrode plates are stacked in a height direction on the basis of a plane such that the electrode plates having opposite polarities face each other in a state in which the separator plate and/or the separation sheet is disposed between the electrode plates, a stack constituted by the electrode plates includes electrode plates having different sizes, and an absolute value of the difference in thickness between the electrode plates having different sizes facing each other is 0 to 79 μm.

In the above description, the plane may be the ground or a plane perpendicular to the ground. For example, the expression "the electrode plates are stacked in the height direction on the basis of the plane" in the above description may mean that the electrode plates may be stacked from the ground in the direction of gravity and/or in the opposite direction of gravity. Consequently, the stacked direction of the electrode plates may be the direction of gravity and/or the opposite direction of gravity.

It is necessary to decide the thickness of each of the electrode plates in consideration of porosity through which the electrode plates are impregnated with an electrolyte. In a conventional electrode assembly, electrolyte impregnation speed may be uniform. In the electrode assembly having steps formed by the electrode plates having different sizes according to the present invention, on the other hand, electrolyte impregnation speed may be nonuniform. In order to compensate for such nonuniform electrolyte impregnation speed, an absolute value of the difference in thickness between the electrode plates having different sizes is set to 0 to 79 µm. The electrode plates having different sizes may be impregnated with an electrolyte at uniform electrolyte impregnation speed within the above range.

The electrode plates having different polarities may be a cathode plate and an anode plate. An N/P ratio of the cathode and anode plates having different sizes may be 1.0 to 1.1. The thicknesses of the cathode and anode plates having different sizes may be changed within the above range of the N/P ratio. In an unlimited embodiment of the present invention, a ratio of the thickness of the anode plate to the thickness of the cathode plate having a size different from that of the anode plate may be 0.5 to 2.0.

If the ratio of the thickness of the anode plate to the thickness of the cathode plate is less than 0.5, lithium ions discharged from the cathode plate may not be fully received by the anode plate with the result that the lithium ions may be separated and thus performance may be lowered and a real capacity may be smaller than a design capacity. On the other hand, if the ratio of the thickness of the anode plate to the thickness of the cathode plate is greater than 2.0, the anode plate may not sufficiently receive lithium ions discharged from the cathode plate during initial charge of the electrode assembly with the result that an irreversible capacity may be increased, a real capacity may be smaller than a design capacity, and energy density, which is a ratio of capacity to density of a battery, may be lowered due to the use of an excessive amount of the anode plate.

In addition, a thickness ratio of the anode and cathode plates having different sizes may be gradually increased or decreased in a direction in which the electrode plates are stacked. Preferably, the thickness ratio of the anode and cathode plates having different sizes is gradually increased in the direction in which the electrode plates are stacked.

In the conventional electrode assembly, an N/P ratio of the cathode and anode plates is generally 1.1 or more. However, the above N/P ratio is provided to balance reactions between the cathode and anode plates having substantially the same size. In a case in which steps are formed due to the difference in thickness between the electrode plates having different sizes as in the electrode assembly according to the present invention, therefore, uniform application may not be possible.

In the above description, the cathode and anode plates having substantially the same size are cathode and anode plates constituting the conventional electrode assembly having no steps unlike the electrode assembly according to the present invention. Consequently, the difference in size between the cathode and anode plates known by a person having ordinary skill in the art to which the present invention pertains as the conventional art may belong to a concept of substantial equality.

If the above general N/P ratio is simply applied to the electrode assembly according to the present invention, an excessive amount of lithium ions may be separated during charge of the electrode assembly with the result that safety of the electrode assembly may be abruptly lowered. In order to solve this problem, the present invention is characterized in that the N/P ratio of the cathode and anode plates having different sizes is 1.0 to 1.1.

Specifically, each of the cathode plates may be configured to have a structure in which a cathode slurry layer is formed on a cathode current collector. The cathode plates may include single-sided cathode plates, each of which has the cathode slurry layer formed on only one major surface of the cathode current collector, and double-sided cathode plates, each of which has the cathode slurry layer formed on opposite major surfaces of the cathode current collector.

The cathode current collector of each of the single-sided cathode plates may have the same thickness as each of the double-sided cathode plates. Alternatively, the cathode current collector of each of the single-sided cathode plates may have a larger thickness than each of the double-sided cathode plates.

In a concrete embodiment of the present invention, a ratio of the thickness of the cathode current collector of each of the single-sided cathode plates to the thickness of the cathode current collector of each of the double-sided cathode plates may be 2.5:1 to 1.5:1, specifically 2:1.

In a preferred embodiment of the present invention, the thickness of the cathode current collector of each of the single-sided cathode plates may be larger than that of the cathode current collector of each of the double-sided cathode plates. In this case, the single-sided cathode plates are prevented from being bent when the cathode plates, each of which has the cathode slurry layer formed on the cathode current collector, are roll pressed.

In a concrete embodiment of the present invention, each of the single-sided cathode plates may have a maximum thickness of 87 to 92 µm, each of the single-sided cathode plates may have a minimum thickness of 70 to 74 µm, each of the double-sided cathode plates may have a maximum thickness of 128 to 133 µm, and each of the double-sided cathode plates may have a minimum thickness of 91 to 99 µm.

In each of the single-sided cathode plates, a loading level of cathode slurry may be 16 mg/cm$^2$ to 22 mg/cm$^2$. In each of the double-sided cathode plates, on the other hand, a loading level of cathode slurry may be 32 mg/cm$^2$ to 44 mg/cm$^2$.

Each of the anode plates may be configured to have a structure in which an anode slurry layer is formed on an anode current collector. The anode plates may include single-sided anode plates, each of which has the anode slurry layer formed on only one major surface of the anode current collector, and double-sided anode plates, each of which has the anode slurry layer formed on opposite major surfaces of the anode current collector.

Similarly, the anode current collector of each of the single-sided anode plates may have the same thickness as each of the double-sided anode plates. Alternatively, the anode current collector of each of the single-sided anode plates may have a larger thickness than each of the double-sided anode plates.

In a concrete embodiment of the present invention, a ratio of the thickness of the anode current collector of each of the single-sided anode plates to the thickness of the anode current collector of each of the double-sided anode plates may be 2.5:1 to 1.5:1, specifically 2:1.

In a preferred embodiment of the present invention, the thickness of the anode current collector of each of the single-sided anode plates may be larger than that of the anode current collector of each of the double-sided anode plates. In this case, the single-sided anode plates are prevented from being bent when the anode plates, each of which has the anode slurry layer formed on the anode current collector, are roll pressed. As a result, yield and manufacturing efficiency may be improved.

In a concrete embodiment of the present invention, each of the single-sided anode plates may have a maximum thickness of 86 to 91 μm, each of the single-sided anode plates may have a minimum thickness of 67 to 70 μm, each of the double-sided anode plates may have a maximum thickness of 139 to 149 μm, and each of the double-sided anode plates may have a minimum thickness of 101 to 108 μm.

In each of the single-sided anode plates, a loading level of anode slurry may be 7.7 mg/cm$^2$ to 10.5 mg/cm$^2$. In each of the double-sided anode plates, on the other hand, a loading level of anode slurry may be 15.4 mg/cm$^2$ to 21 mg/cm$^2$.

A relatively large-sized one of the electrode plates having different sizes facing each other may be an anode plate. In this case, an anode slurry layer may be formed at opposite major surfaces of the anode plate facing the cathode plate in a state in which the separator plate or the separation sheet is disposed between the anode plate and the cathode plate. The anode slurry layer may be formed at only a region of the anode plate corresponding to a region of the cathode plate facing the anode plate at which a cathode slurry layer is formed.

In a case in which a relatively large-sized one of the electrode plates disposed adjacent to each other in a state in which the separator plate or the separation sheet is disposed between the electrode plates is an anode plate, the anode plate may function as a safety member when an object, such as a nail, presses or penetrates the battery. Consequently, a primary minute short circuit of a battery may be caused, thereby preventing combustion and explosion of the battery.

The function of the anode plate as the safety member is very important in a battery module or a battery pack in which combustion and explosion of a battery constituting a battery module or a battery pack may lead to combustion and explosion of the battery module or the battery pack.

In addition, in a case in which a relatively large-sized one of the electrode plates disposed adjacent to each other in a state in which the separation sheet is disposed between the electrode plates is an anode plate, it is possible to minimize dendritic growth during charge and discharge of the battery as compared with in a case in which a relatively large-sized one of the electrode plates disposed adjacent to each other in a state in which the separation sheet is disposed between the electrode plates is a cathode plate.

However, the present invention is not limited to the above construction. For example, a relatively large-sized one of the electrode plates having different sizes facing each other may be a cathode plate. In this case, a cathode slurry layer may be formed at opposite major surfaces of the cathode plate facing the anode plate in a state in which the separator plate or the separation sheet is disposed between the cathode plate and the anode plate. The cathode slurry layer may be formed at only a region of the cathode plate corresponding to a region of the anode plate facing the cathode plate at which an anode slurry layer is formed.

The stack of the electrode plates may be configured to have a structure in which a single-sided cathode plate or a single-sided anode plate is stacked on the lowermost end of the stack.

Specifically, in a case in which a single-sided anode plate is stacked on the lowermost end of the stack, an anode slurry layer may be formed at only one major surface of the single-sided anode plate facing a cathode plate in a state in which the separator plate or the separation sheet is disposed between the single-sided anode plate and the cathode plate. In this case, the anode slurry layer may be formed at only a region of the single-sided anode plate corresponding to a region of the cathode plate facing the anode plate at which a cathode slurry layer is formed.

On the other hand, in a case in which a single-sided cathode plate is stacked on a lowermost end of the stack, an anode slurry layer may be formed at only one major surface of the single-sided cathode plate facing an anode plate in a state in which the separator plate or the separation sheet is disposed between the single-sided cathode plate and the anode plate. In this case, the cathode slurry layer may be formed at only a region of the single-sided cathode plate corresponding to a region of the anode plate facing the single-sided cathode plate at which an anode slurry layer is formed.

Each of the electrode plates may have right-angled corners or at least one of the corners of the electrode plates may be curved. More specifically, at least one of four corners of the electrode plates formed in a quadrangular shape in plane may be curved. In a case in which at least one of the corners of the electrode plates is curved as described above, impact applied to the curved corner of the electrode plates is reduced when the electrode assembly is dropped, thereby improving safety.

The separation sheet may be disposed between the cathode plates and the anode plates while covering one side surfaces of the electrode plates to securely maintain interface contact between the electrode plates and the separation sheet due to repetitive charge and discharge. Specifically, tensile force generated during winding of the separation sheet may provide pressure to achieve tight interface contact between the electrode plates and the separation sheet.

According to circumstances, the separation sheet may cover a portion or the entirety of the stack. At this time, the end of the separation sheet may be fixed by thermal welding or taping.

On the other hand, the separation sheet, which covers the side surfaces of the electrode plates constituting the stack, may not be disposed in tight contact with the side surfaces of the electrode plates having different sizes but may be spaced apart from the side surfaces of the electrode plates by a predetermined distance. In this case, therefore, the portion of the separation sheet spaced apart from the side surfaces of the electrode plates may be cut or heated such that the separation sheet tightly contacts the side surfaces of the electrode plates.

The shape of the electrode plates is not particularly restricted. For example, each of the electrode plates may be formed in the shape of a parallelepiped. Alternatively, each of the electrode plates may be formed in a polygonal or circular shape in plane. Furthermore, each of the electrode plates may be formed in a flat shape or a curved flat shape. Specifically, each of the electrode plates may be formed in the shape of a parallelepiped having an overall width, an overall length, and an overall height. The parallelepiped may be formed in a quadrangular shape in plane.

The electrode plates may include two or more electrode plates having different sizes. Alternatively, the electrode plates may include two or more electrode plates, one of which has a different size from the other electrode plates having the same size. Specifically, the electrode plates may include a combination of two or more electrode plates (A) having the same size and two or more electrode plates (B) having the same and different size from the electrode plates (A) or a combination of two or more electrode plates (A) having the same size, two or more electrode plates (B) having the same and different size from the electrode plates (A), and two or more electrode plates (C) having the same and different size from the electrode plates (A) and the electrode plates (B).

In accordance with another aspect of the present invention, there is provided a lithium secondary battery configured to have a structure in which the electrode assembly with the above-stated construction is mounted in a battery case in a sealed state such that the electrode assembly is impregnated with an electrolyte. The battery case is formed of a laminate sheet including a resin layer and a metal layer. The battery case may have a receiving part, in which the electrode assembly having the stepped structure according to the present invention is mounted. The receiving part may have a stepped structure corresponding to the shape of the electrode assembly having the stepped structure according to the present invention.

The lithium secondary battery may be used as a power source for a device selected from among a mobile phone, a portable computer, a smartphone, a smart pad, a netbook computer, a light electric vehicle (LEV), an electric vehicle, a hybrid electric vehicle, a plug-in hybrid electric vehicle, and a power storage unit.

The structure of the lithium secondary battery and a method of manufacturing the lithium secondary battery or the structure of the device and a method of manufacturing the device are well known in the art to which the present invention pertains, and therefore, a detailed description thereof will be omitted.

Effects of the Invention

As is apparent from the above description, the electrode assembly according to the present invention includes a stepped structure changed based on the curvature of a device. Consequently, the present invention has an effect of increasing the capacity of the device per unit volume by utilizing a dead space defined in the device unlike a conventional electrode assembly.

DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1A:
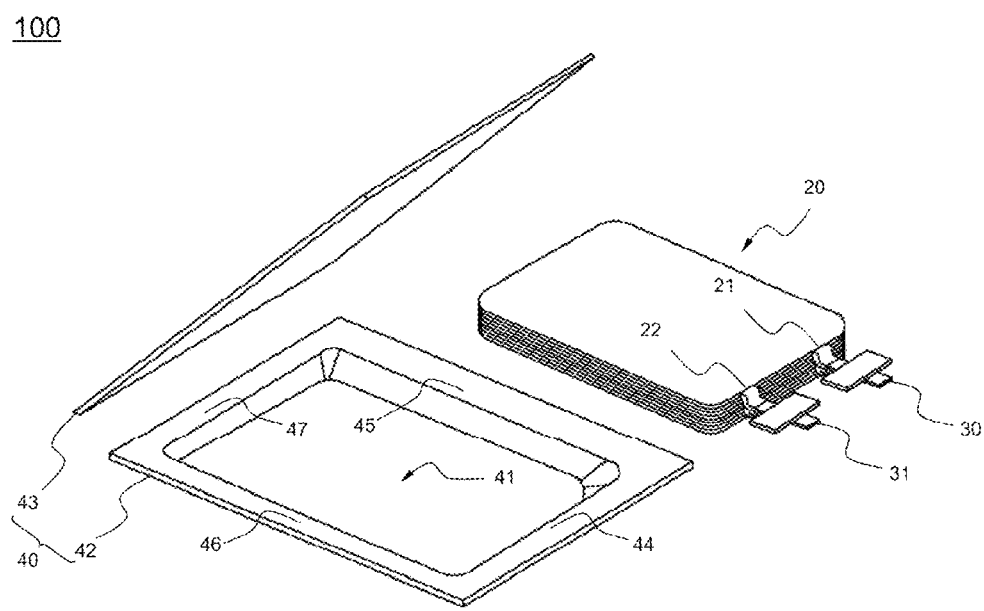
FIGS. 1A and 1B are exploded perspective views showing a conventional representative pouch-shaped secondary battery.
Figure 1B:
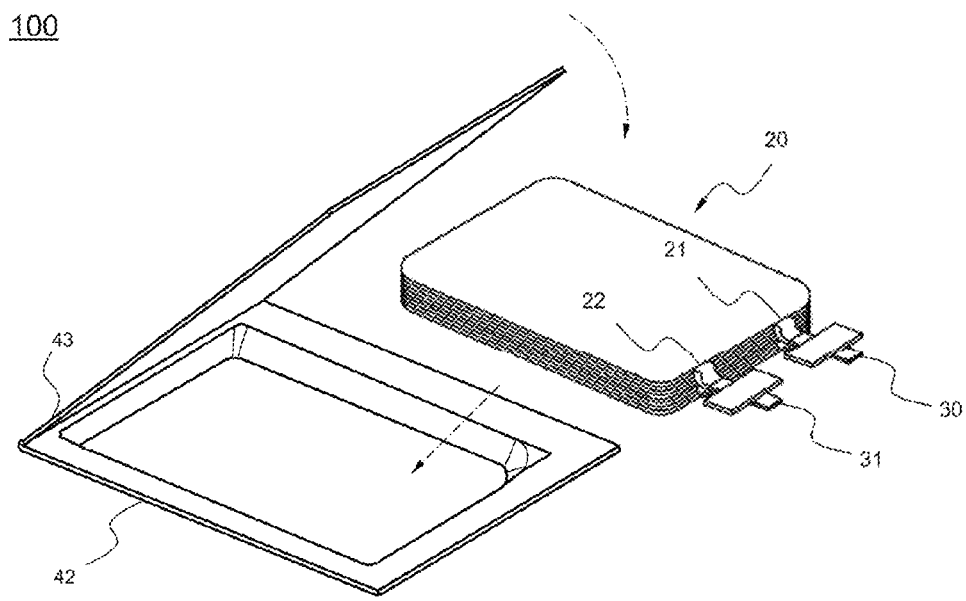
Figure 2:
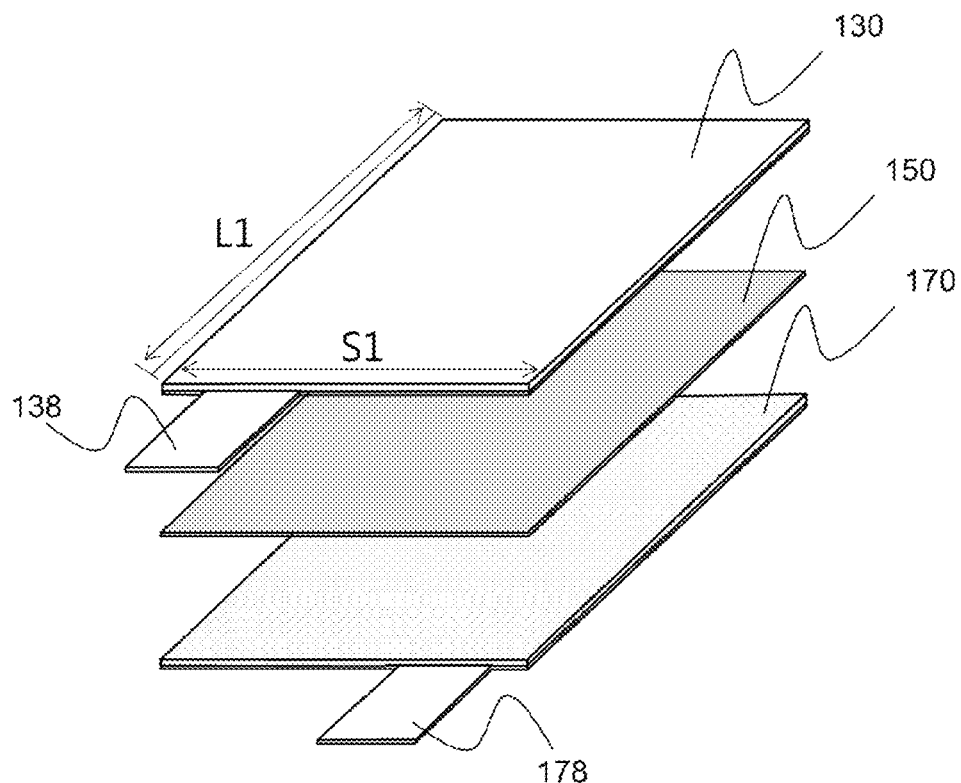
FIGS. 2 and 3 are a perspective view and a vertical sectional view typically showing electrode plates and a separator plate constituting an electrode assembly according to the present invention.
Figure 3:
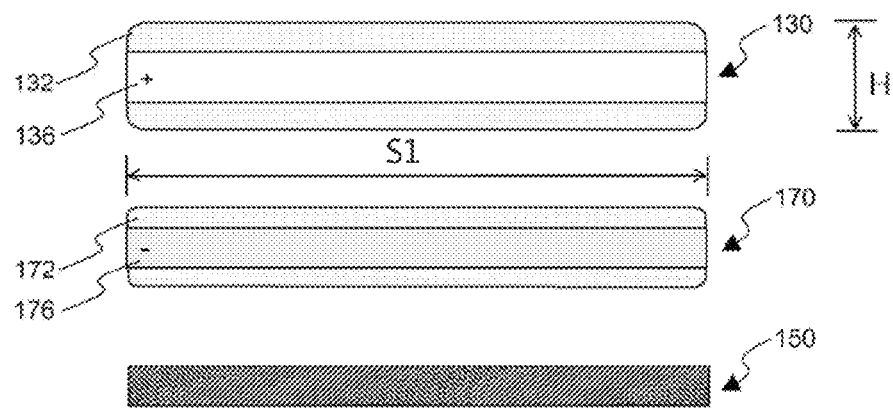

A cathode plate 130, an anode plate 170, and a separator plate 150 constituting an electrode assembly according to the present invention are typically shown in FIGS. 2 and 3. Referring to FIGS. 2 and 3, the cathode plate 130 is configured to have a structure in which cathode slurry 132 is applied to a cathode current collector 136 and the anode plate 170 is configured to have a structure in which anode slurry 172 is applied to an anode current collector 176.

In the cathode plate 130 of FIG. 2, the cathode slurry 132 is applied to the top and bottom of the cathode current collector 136. In the anode plate 170 of FIG. 2, the anode slurry 172 is applied to the top and bottom of the anode current collector 176. The cathode plate 130 and the anode plate 170 of FIGS. 2 and 3 are formed in the shape of a rectangular parallelepiped having an overall length L1, an overall width S1, and an overall height H.

Figure 4:
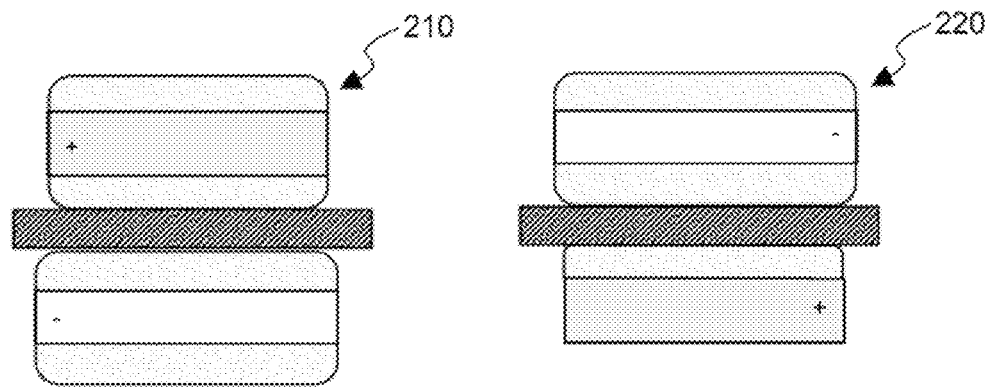
FIGS. 4 and 5 are vertical sectional views typically showing unit cells configured to have a structure in which the uppermost electrode plate and the lowermost electrode plate have different polarities.
Figure 5:
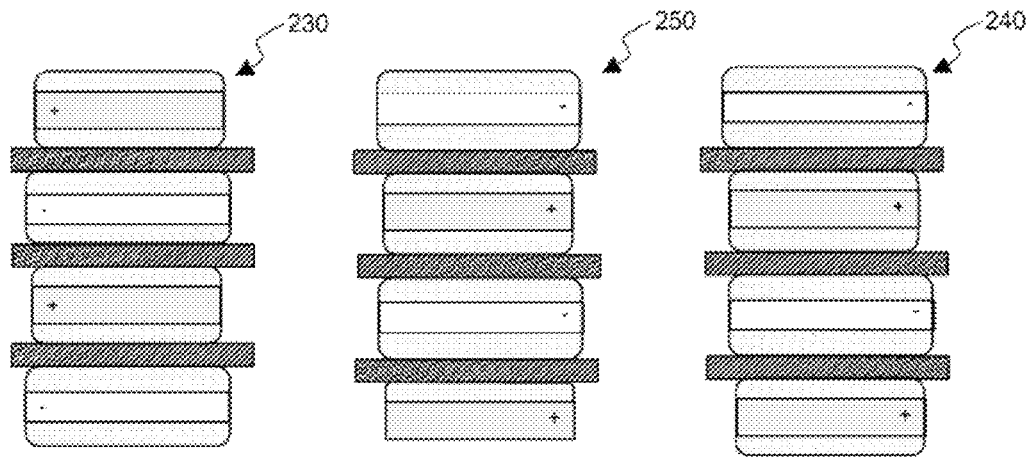
Figure 6:
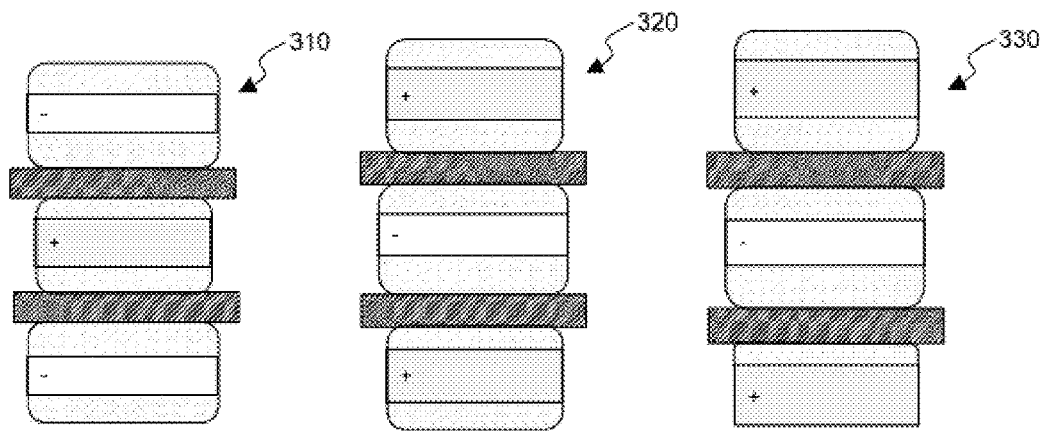
FIG. 6 is a vertical sectional view typically showing unit cells configured to have a structure in which the uppermost electrode plate and the lowermost electrode plate have the same polarity.

FIGS. 4 to 6 are vertical sectional views typically showing electrode assemblies 300 and 400 configured to have a structure in which the cathode plate 130 and the anode plate 170 of FIG. 3 are alternately stacked in the height direction on the basis of a plane parallel to the stack plane in a state in which the separator plate 150 is disposed between the cathode plate 130 and the anode plate 170.

In electrode assemblies 210, 220, 230, 240, and 250 of FIGS. 4 and 5, the uppermost one and the lowermost one of the stacked electrode plates have different polarities. In electrode assemblies 310, 320, and 330 of FIG. 6, on the other hand, the uppermost one and the lowermost one of the stacked electrode plates have the same polarity.

Cathode slurry is applied to only one major surface of the lowermost cathode plate of each of the electrode assemblies 220, 250, and 330 directly contacting the separator plate stacked on the lowermost cathode plate.

Figure 7:
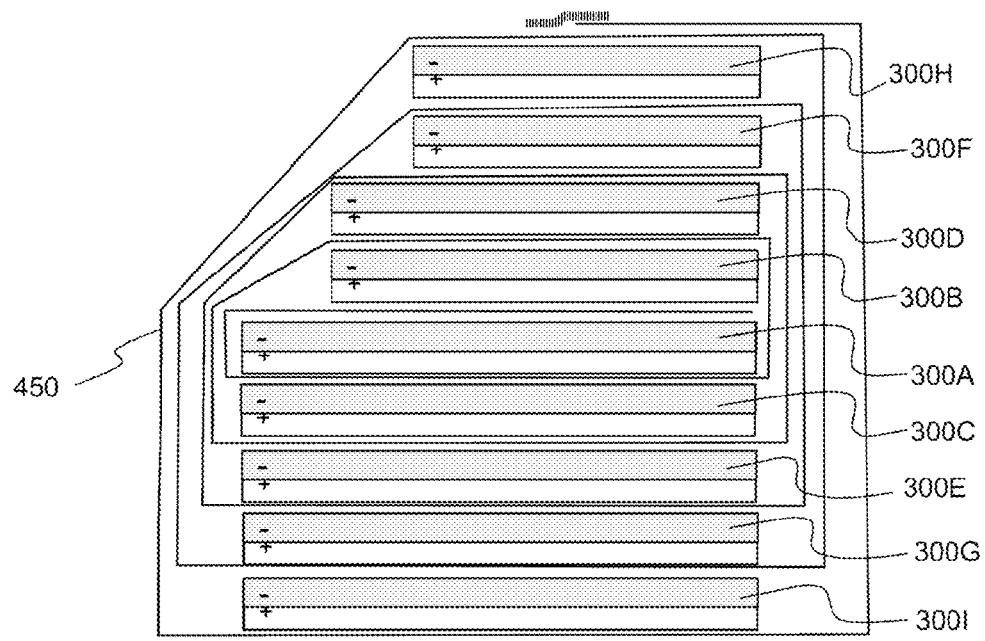
FIG. 7 is a vertical sectional view typically showing an electrode assembly according to an embodiment of the present invention.

FIG. 7 is a vertical sectional view typically showing an electrode assembly according to the present invention including only the electrode assemblies of FIGS. 4 and 5.

Specifically, electrode assemblies 300I, 300G, 300E, 300C, and 300A having the same and larger overall width than electrode assemblies 300B, 300D, 300F, and 300H are sequentially stacked on the lowermost end of the electrode assembly in the height direction on the basis of a plane, the electrode assemblies 300B and 300D having the same but smaller overall width than the electrode assemblies 300I, 300G, 300E, 300C, and 300A are sequentially stacked on the upper end of the electrode assembly 300A, and the electrode assemblies 300F and 300H having the same but smaller overall width than the electrode assemblies 300B and 300D are sequentially stacked on the upper end of the electrode assembly 300D.

In this case, the lowermost electrode assembly 300I may be constituted by the electrode assemblies 220 and 250 of FIGS. 3 and 4.

The electrode assemblies 300I, 300G, 300E, 300C, 300A, 300B, 300D, 300F, and 300H are stacked such that one side surfaces or the other side surfaces of the electrode assemblies 300I, 300G, 300E, 300C, 300A, 300B, 300D, 300F, and 300H are aligned or on the same plane.

One major surface, the other major surface, one side surface, and the other side surface of each of the electrode assemblies 300I, 300G, 300E, 300C, 300A, 300B, 300D, 300F, and 300H are covered by a separation film 450. The outside of a stack constituted by the electrode assemblies 300I, 300G, 300E, 300C, 300A, 300B, 300D, 300F, and 300H is also covered by the separation film 450.

After the outside of the stack constituted by the electrode assemblies 300I, 300G, 300E, 300C, 300A, 300B, 300D, 300F, and 300H is covered by the separation film 450, the separation film 450 may be fixed by thermal welding or taping. In FIG. 7, the separation film 450 is fixed by taping after the outside of the stack constituted by the electrode assemblies 300I, 300G, 300E, 300C, 300A, 300B, 300D, 300F, and 300H is covered by the separation film 450.

Figure 8:
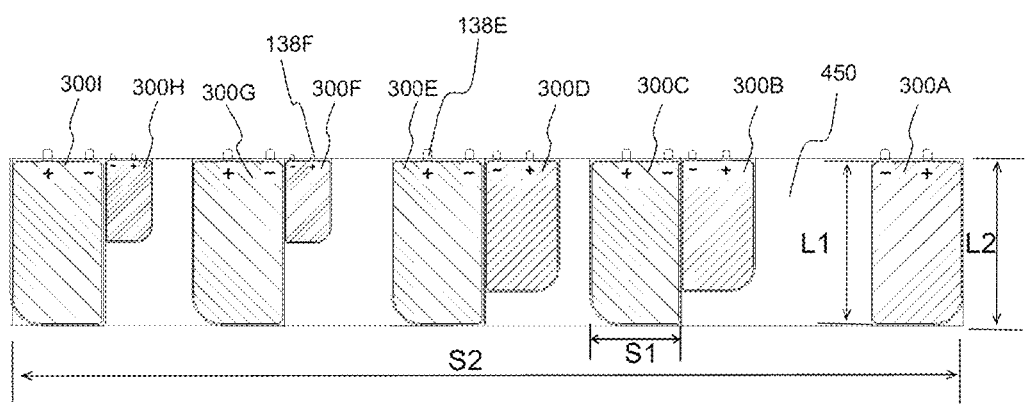
FIG. 8 is a development view typically showing the electrode assembly of FIG. 7.

FIG. 8 is a development view typically showing the electrode assembly of FIG. 7. The electrode assemblies 300A, 300B, 300C, 300D, 300E, 300F, 300G, 300H, and 300I are sequentially arranged on the separation film 450 having a width L2 equivalent to the electrode assemblies 300A, 300C, 300E, and 300I having the largest overall length L1 in the length (S2) direction of the separation film 450. Specifically, the electrode assembly 300A is spaced apart from the electrode assembly 300B by a distance corresponding to the sum of the overall width S1 of the electrode assembly 300A and the height of the electrode assembly 300B and the electrode assembly 300C is spaced apart from the electrode assembly 300B by a distance equivalent to the sum of the heights of the electrode assemblies 300A and 300B and the thickness of the separation film 450. In this way, the electrode assemblies 300A, 300B, 300C, 300D, 300E, 300F, 300G, 300H, and 300I are sequentially arranged on the separation film 450 at predetermined intervals. The electrode assembly 300A is located at a folding start point and the electrode assembly 300I is located at a folding end point.

The separation film, on which the electrode assemblies 300A, 300B, 300C, 300D, 300E, 300F, 300G, 300H, and 300I are arranged as described above, may be folded to manufacture the electrode assembly of FIG. 7.

One corner of each of the electrode assemblies 300A, 300B, 300C, 300D, 300E, 300F, 300G, 300H, and 300I is curved in plane. Of course, even in a case in which corners of each of the electrode assemblies 300A, 300B, 300C, 300D, 300E, 300F, 300G, 300H, and 300I of FIG. 8 are right-angled in plane, the electrode assemblies 300A, 300B, 300C, 300D, 300E, 300F, 300G, 300H, and 300I may be arranged as shown in FIG. 8 to manufacture the electrode assembly of FIG. 7.

Referring to FIG. 8, the overall width of electrode tabs of the electrode assemblies 300A, 300C, 300E, 300G, and 300I is larger than that of electrode tabs of the electrode assemblies 300B and 300D. Similarly, the overall width of the electrode tabs of the electrode assemblies 300B and 300D is larger than that of electrode tabs of the electrode assemblies 300F and 300H.

Specifically, cathode tabs 138E and 138F of the electrode assemblies 300E and 300F have different overall widths. On the other hand, cathode tabs of the electrode assemblies 300A, 300B, 300C, 300D, 300E, 300F, 300G, 300H, and 300I have the same overall width.

Referring to FIG. 8, the separation film 450 has a sufficient length S2 to cover one major surface, the other major surface, one side surface, and the other side surface of each of the electrode assemblies 300I, 300G, 300E, 300C, 300A, 300B, 300D, 300F, and 300H. However, those skilled in the art will appreciate that the separation film 450 has a sufficient length to cover the outside of the stack constituted by the electrode assemblies 300I, 300G, 300E, 300C, 300A, 300B, 300D, 300F, and 300H.

Referring to FIG. 7, a space corresponding to the difference in overall width between the electrode assembly 300A and the electrode assembly 300B is formed at a stack interface between the electrode assembly 300A and the electrode assembly 300B. In addition, a space corresponding to the difference in overall width between the electrode assembly 300D and the electrode assembly 300F is formed at a stack interface between the electrode assembly 300D and the electrode assembly 300F. Consequently, a stepped structure having a width and a height is formed at the stack interfaces among the electrode assemblies 300A, 300B, and 300F. The width of the stepped structure may be changed according to the difference in overall width among the electrode assemblies 300A, 300B, and 300F. The electrode plates forming the width of the stepped structure are anode plates.

In connection with this case, the electrode assembly of FIG. 7 is manufactured using the stacked type electrode assemblies of FIGS. 4 and 5, and therefore, the electrode assemblies have different overall widths. Consequently, those skilled in the art will appreciate from the above description that even in a case in which the electrode assemblies have different overall lengths, the stepped structure may have a width corresponding to the difference in overall lengths among the electrode assemblies In addition, referring to FIG. 7, the electrode assemblies 300I, 300G, 300E, 300C, 300A, 300B, 300D, 300F, and 300H have the same height. Consequently, the sum of the heights of the two electrode assemblies 300B and 300D is less than the sum of the heights of the four electrode assemblies 300I, 300G, 300C, and 300A. As a result, the electrode assembly of FIG. 7 includes a stepped structure having a height difference. As previously described, the width and the height of the stepped structure may be changed based on the curvature of a curved device.

Figure 11:
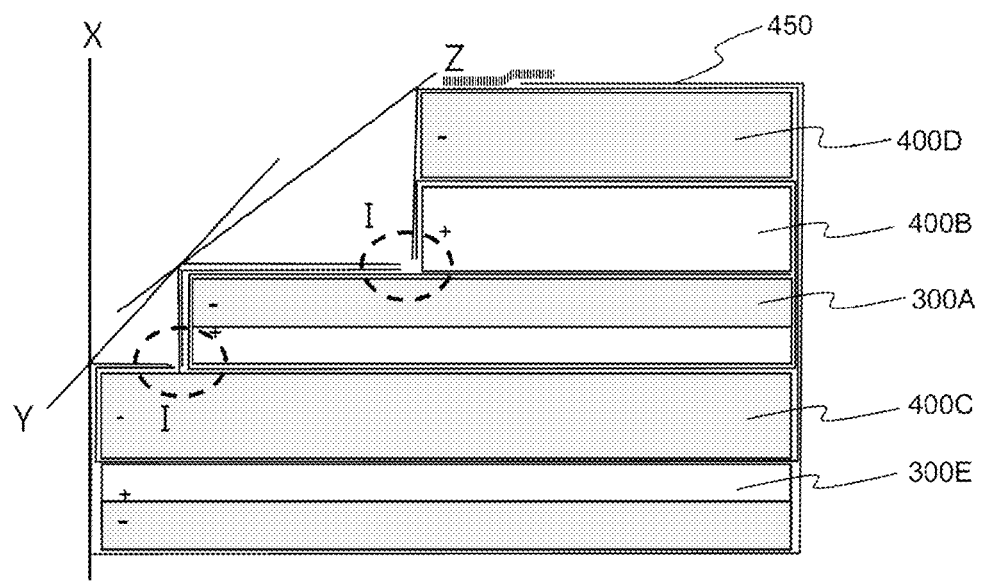

In connection with this case, FIG. 11 is a vertical sectional view typically showing an electrode assembly according to the present invention including the stacked type electrode assemblies of FIGS. 4 to 6.

The electrode assembly of FIG. 11 is different from the electrode assembly of FIG. 7 in that electrode assemblies 300E and 400C having the same and larger overall width than electrode assemblies 300A, 400B, and 400D are sequentially stacked on the lowermost end of the electrode assembly in the height direction on the basis of a plane, the electrode assembly 400C having smaller overall width than the electrode assemblies 300E and 400C is stacked on the upper end of the electrode assembly 400C, and the electrode assemblies 400B and 400D having the same but smaller overall width than the electrode assembly 300A are sequentially stacked on the upper end of the electrode assembly 300A.

In addition, the electrode assembly of FIG. 11 is different from the electrode assembly of FIG. 7 in that one major surface, the other major surface, one side surface, and the other side surface of each of the electrode assemblies 300E, 400C, 300A, 400B, and 400D are in tight contact with a separation film 450. Specifically, referring to dotted-line circles I, the separation film 450 is cut such that the separation film 450 tightly contacts one side surfaces or the other side surfaces of the electrode assemblies 300E, 400C, 300A, 400B, and 400D at which the stepped structure is formed.

Referring to FIG. 11, an angle between a straight line Y tangent to an angular point of the stack constituted by the electrode assemblies 300E and 400C and to an angular point of the electrode assembly 300A and an arbitrary perpendicular line X tangent to one side surface or the other side surface of each of the electrode assemblies 300E and 400C having the largest overall width is smaller than an angle between a straight line Z tangent to an angular point of the stack constituted by the electrode assemblies 400B and 400D and to the angular point of the electrode assembly 300A and the perpendicular line X. However, these angles may be changed based on the curvature of a device.

Figure 9:
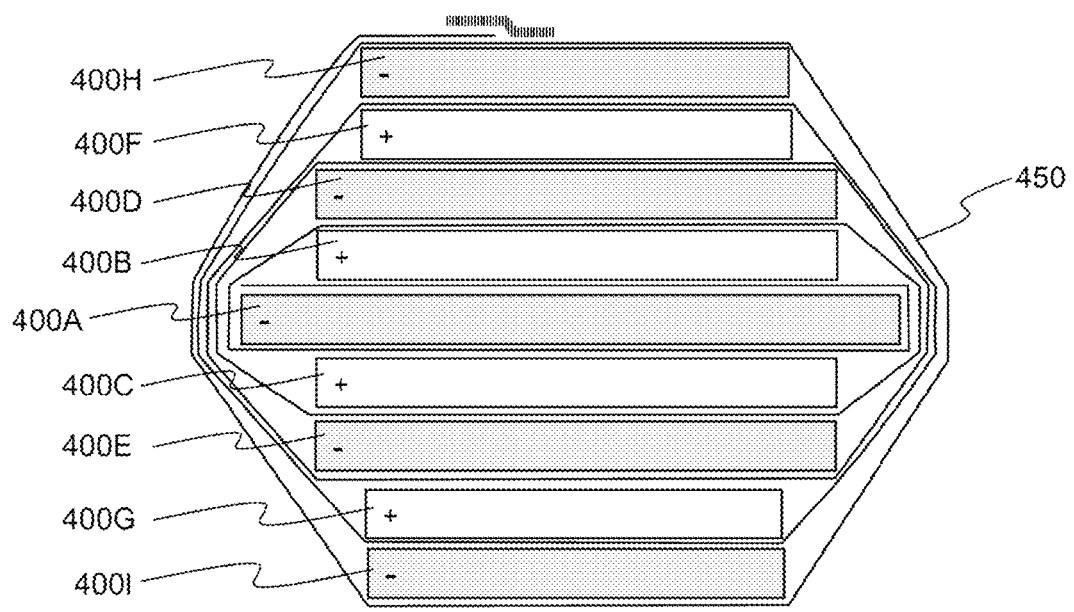
FIGS. 9 to 12 are vertical sectional views showing an electrode assembly according to another embodiment of the present invention.

An electrode assembly of FIG. 9 is different from the electrode assembly of FIG. 7 in that electrode assemblies 400A, 400B, 400C, 400D, 400E, 400F, 400G, 400H, and 400I, the uppermost electrode plate and the lowermost electrode plate of each of which have the same polarity, are stacked in the height direction and the direction opposite to the height direction, i.e. in opposite directions, on the basis of a plane. In this case, the electrode assemblies 400A, 400B, 400C, 400D, 400E, 400F, 400G, 400H, and 400I may be cathode plates or anode plates.

In addition, the electrode assembly of FIG. 9 is different from the electrode assembly of FIG. 7 in that one side surfaces or the other side surfaces of the electrode assemblies 400A, 400B, 400C, 400D, 400E, 400F, 400G, 400H, and 400I are neither aligned nor on the same plane.

Figure 10:
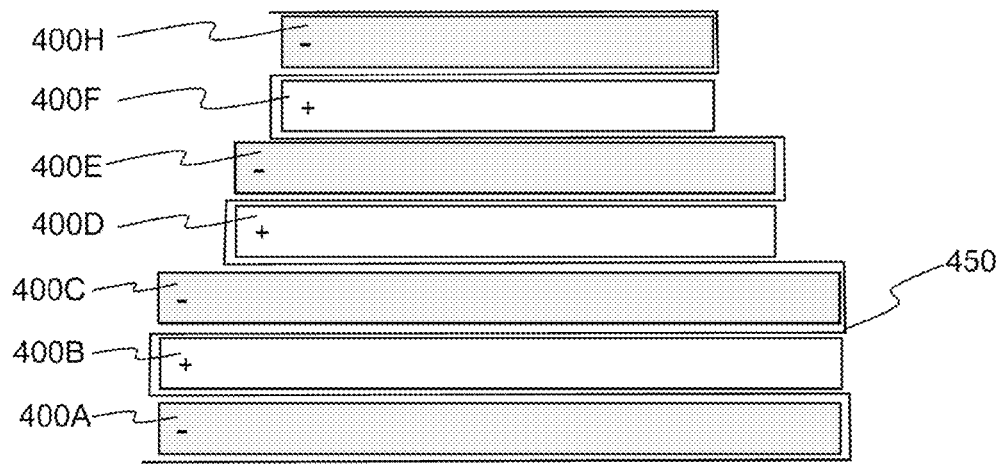

An electrode assembly of FIG. 10 is different from the electrode assembly of FIG. 9 in that electrode assemblies 400A, 400B, 400C, 400D, 400E, 400F, 400G, and 400H, the uppermost electrode plate and the lowermost electrode plate of each of which have the same polarity, are stacked only in the height direction or the direction opposite to the height direction on the basis of a plane.

In addition, the electrode assembly of FIG. 10 is different from the electrode assembly of FIG. 9 in that a separation film 450 covers only one side surface or the other side surface of each of the electrode assemblies 400A, 400B, 400C, 400D, 400E, 400F, 400G, and 400H.

Figure 12:
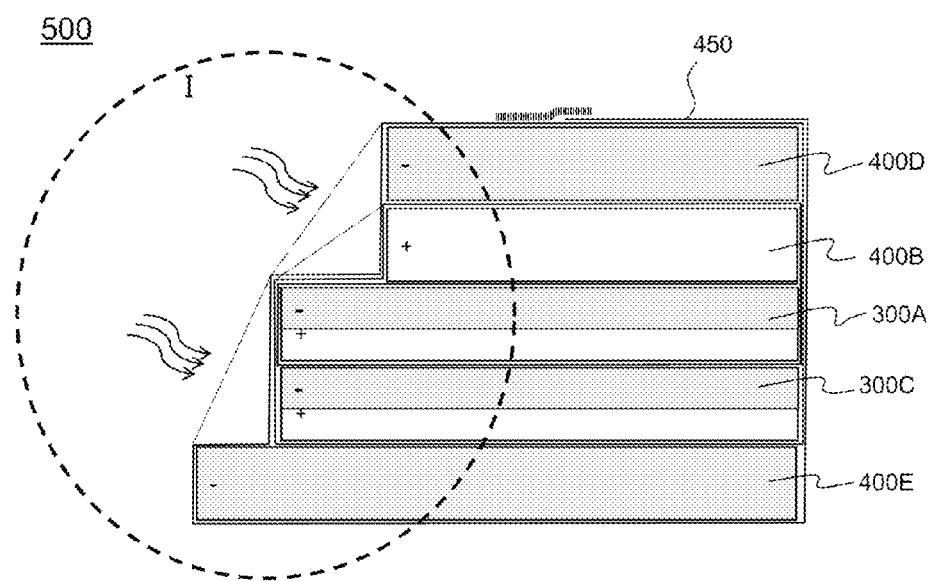

An electrode assembly of FIG. 12 is identical to the electrode assembly of FIG. 11 in that the electrode assembly of FIG. 12 includes the stacked type electrode assemblies of FIGS. 4 to 6. However, the electrode assembly of FIG. 12 is different from the electrode assembly of FIG. 11 in that a separation film 450 is heated such that the separation film 450 tightly contacts one side surfaces or the other side surfaces of electrode assemblies 300A, 400B, 300C, 400D, and 400E at which a stepped structure is formed (see a dotted-line circle I).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrode assembly comprising:
   two or more unit cells, each unit cell including:
   two or more electrode plates, each of which has at least one electrode tab, and
   a separator plate disposed between adjacent electrode plates,
   wherein the electrode plates are stacked in a height direction on the basis of a plane such that the electrode plates having opposite polarities face each other in a state in which the separator plate is disposed between adjacent electrode plates, and
   a one-unit separation sheet disposed between adjacent unit cells to cover major and side surfaces of all of the unit cells, which constitute an electrode tab non-formation region,
   wherein at least two of the unit cells have different sizes, and the unit cells are stacked in the height direction,
   wherein the electrode plates comprise cathode plates, each of which has a cathode slurry layer formed on a cathode current collector, and anode plates, each of which has an anode slurry layer formed on an anode current collector,
   wherein the cathode plates comprise single-sided cathode plates, each of which has the cathode slurry layer formed on only one major surface of the cathode current collector, and double-sided cathode plates, each of which has the cathode slurry layer formed on opposite major surfaces of the cathode current collector,
   wherein a cathode current collector of each of the single-sided cathode plates has a larger thickness than that of each of the double-sided cathode plates.

2. The electrode assembly according to claim 1, wherein an N/P ratio of differently sized cathode and anode plates of the electrode plates is 1.0 to 1.1.

3. The electrode assembly according to claim 1, wherein a ratio of the thickness of the cathode current collector of each of the single-sided cathode plates to the thickness of the cathode current collector of each of the double-sided cathode plates is 2.5:1 to 1.5:1.

4. The electrode assembly according to claim 1, wherein each of the single-sided cathode plates has a maximum thickness of 87 μm to 92 μm.

5. The electrode assembly according to claim 1, wherein each of the double-sided cathode plates has a maximum thickness of 128 μm to 133 μm.

6. The electrode assembly according to claim 1, wherein each of the single-sided cathode plates has a minimum thickness of 70 μm to 74 μm.

7. The electrode assembly according to claim 1, wherein each of the double-sided cathode plates has a minimum thickness of 91 μm to 99 μm.

8. The electrode assembly according to claim 1, wherein each of the single-sided cathode plates has a loading level of 16 mg/cm$^2$ to 22 mg/cm$^2$.

9. The electrode assembly according to claim 1, wherein each of the double-sided cathode plates has a loading level of 32 mg/cm$^2$ to 44 mg/cm$^2$.

10. The electrode assembly according to claim 1, wherein the anode plates comprise single-sided anode plates, each of which has the anode slurry layer formed on only one major surface of the anode current collector, and double-sided anode plates, each of which has the anode slurry layer formed on opposite major surfaces of the anode current collector.

11. The electrode assembly according to claim 10, wherein the anode current collector of each of the single-sided anode plates has a larger thickness than that of each of the double-sided anode plates.

12. The electrode assembly according to claim 11, wherein a ratio of the thickness of the anode current collector of each of the single-sided anode plates to the thickness of the anode current collector of each of the double-sided anode plates is 2.5:1 to 1.5:1.

13. The electrode assembly according to claim 10, wherein each of the single-sided anode plates has a maximum thickness of 86 μm to 91 μm.

14. The electrode assembly according to claim 10, wherein each of the double-sided anode plates has a maximum thickness of 139 μm to 149 μm.

15. The electrode assembly according to claim 10, wherein each of the single-sided anode plates has a minimum thickness of 67 μm to 70 μm.

16. The electrode assembly according to claim 10, wherein each of the double-sided anode plates has a minimum thickness of 101 μm to 108 μm.

17. The electrode assembly according to claim 10, wherein each of the single-sided anode plates has a loading level of 7.7 mg/cm$^2$ to 10.5 mg/cm$^2$.

18. The electrode assembly according to claim 10, wherein each of the double-sided anode plates has a loading level of 15.4 mg/cm$^2$ to 21 mg/cm$^2$.

19. The electrode assembly according to claim 1, wherein a relatively large-sized one of the electrode plates having different sizes facing each other is an anode plate.

20. The electrode assembly according to claim 19, wherein an anode slurry layer is formed at opposite major surfaces of the anode plate facing the cathode plate in a state in which the separator plate or the separation sheet is disposed between the anode plate and the cathode plate, and wherein the anode slurry layer is formed at only a region of the anode plate corresponding to a region of the cathode plate facing the anode plate at which a cathode slurry layer is formed.

21. The electrode assembly according to claim 1, wherein a relatively large-sized one of the electrode plates having different sizes facing each other is a cathode plate, wherein a cathode slurry layer is formed at opposite major surfaces of the cathode plate facing the anode plate in a state in which the separator plate or the separation sheet is disposed between the cathode plate and the anode plate, and wherein the cathode slurry layer is formed at only a region of the cathode plate corresponding to a region of the anode plate facing the cathode plate at which an anode slurry layer is formed.

22. The electrode assembly according to claim 1, wherein a single-sided anode plate is stacked on a lowermost end of the electrode assembly and an anode slurry layer is formed at only one major surface of the single-sided anode plate facing a cathode plate in a state in which the separator plate or the separation sheet is disposed between the single-sided anode plate and the cathode plate.

23. The electrode assembly according to claim 22, wherein the anode slurry layer is formed at only a region of the single-sided anode plate corresponding to a region of the cathode plate facing the anode plate at which a cathode slurry layer is formed.

24. The electrode assembly according to claim 1, wherein a single-sided cathode plate is stacked on a lowermost end of the electrode assembly, a cathode slurry layer is formed at only one major surface of the single-sided cathode plate facing an anode plate in a state in which the separator plate or the separation sheet is disposed between the single-sided cathode plate and the anode plate, and the cathode slurry layer is formed at only a region of the single-sided cathode plate corresponding to a region of the anode plate facing the single-sided cathode plate at which an anode slurry layer is formed.

25. The electrode assembly according to claim 1, wherein at least one corner of the electrode plates is curved.

26. The electrode assembly according to claim 1, wherein the separation sheet is disposed in contact with the side surfaces of the electrode plates of the unit cells.

27. The electrode assembly according to claim 1, wherein a thickness ratio of adjacent ones of the electrode plates having different sizes among of all of the unit cells is increased in the height direction.

28. The electrode assembly according to claim 1, wherein an absolute value of the difference in thickness between the electrode plates having different sizes facing each other is 0 to 79 μm.

29. A lithium secondary battery comprising the electrode assembly according to claim 1.

* * * * *